United States Patent [19]

Faulkner

[11] Patent Number: 4,899,488

[45] Date of Patent: Feb. 13, 1990

[54] MULTI-FUNCTIONAL TOOL FOR APPLYING FLUID AGRICULTURAL AGENTS

[75] Inventor: Jeffrey E. Faulkner, Teaneck, N.J.

[73] Assignee: American Cyanamid Company, Stamford, Conn.

[21] Appl. No.: 288,476

[22] Filed: Dec. 22, 1988

[51] Int. Cl.$^4$ ............................................. A01G 29/00
[52] U.S. Cl. .................................................... 47/57.5
[58] Field of Search ............... 47/57.5; 30/123, 133.3; 239/289, 444, 446

[56] References Cited

U.S. PATENT DOCUMENTS

| 1,054,485 | 2/1913 | Archard | 47/57.5 |
| 2,803,924 | 8/1957 | Little | 47/57.5 |
| 2,846,817 | 8/1958 | Haislet | 47/57.5 |
| 2,853,833 | 9/1958 | Hash | 47/57.5 |
| 3,286,402 | 11/1966 | Newton | 47/57.5 |
| 3,559,340 | 2/1971 | Good | 47/57.5 |
| 4,090,327 | 5/1978 | Cowson | 47/57.5 |

FOREIGN PATENT DOCUMENTS 1097644  1/1968  United Kingdom ................ 47/57.5

OTHER PUBLICATIONS

Down to Earth, Dec. 1950, Dow Chemical Co., vol. 6, No. 3, F. A. Ashbaugh.

Primary Examiner—David A. Scherbel
Assistant Examiner—Jerrold D. Johnson
Attorney, Agent, or Firm—Mark P. Stone

[57] ABSTRACT

The present invention provides a multi-functional tool for applying a fluid agricultural treatment agent, particularly a liquid herbicide, to different types of plant life in the most effective manner for each type. The tool includes a first spray nozzle mounted on the forward tool head and a switch for discharging liquid through the first nozzle in a direction selected by the user. The tool further includes a cutting blade mounted to its head, and a second spray nozzle positioned proximate to the cutting blade. A second switch for the second spray nozzle is automatically actuated to discharge the liquid agent in a direction towards the leading edge of the blade as the blade cuts into a thick plant such as a tree, and is automatically deactuated as the cutting blade is retracted. The single tool of the present invention enables the user to selectively apply the liquid agent both externally and internally in the manner most effective for the specific plant life being treated.

20 Claims, 1 Drawing Sheet

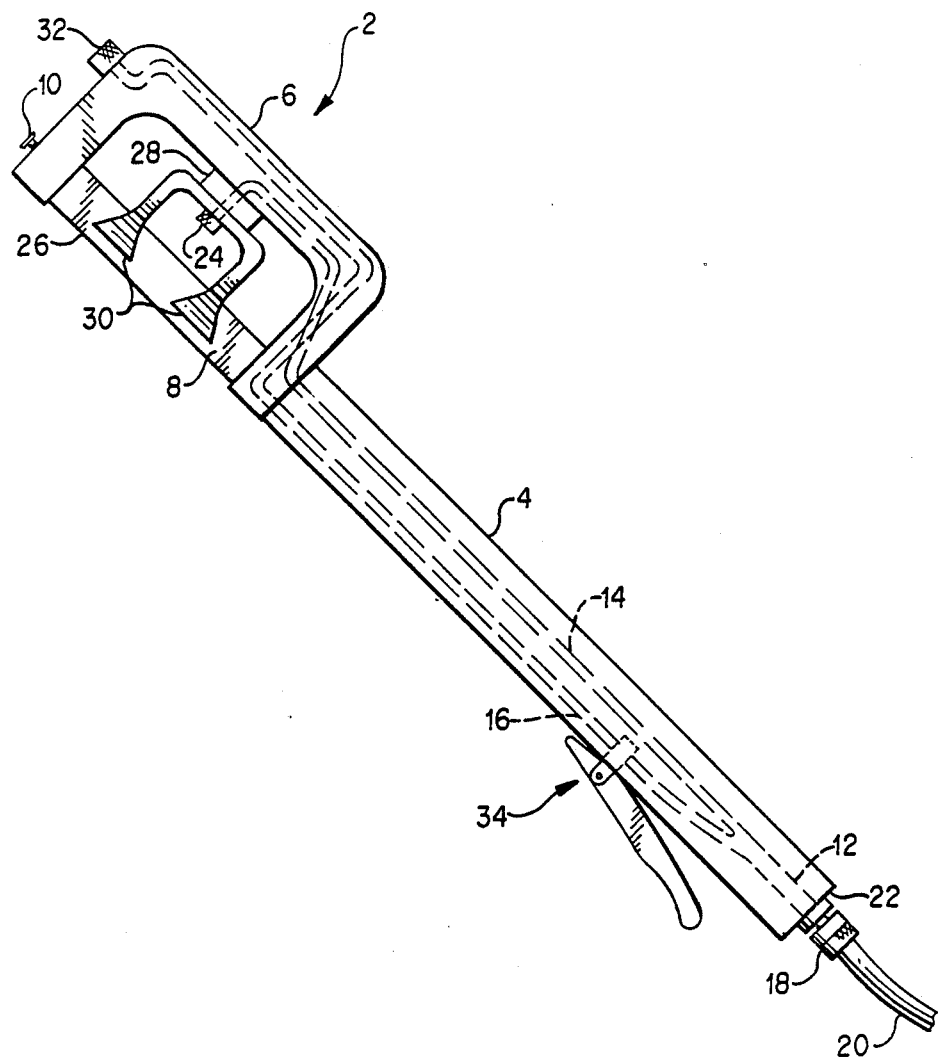

MULTI-FUNCTIONAL TOOL FOR APPLYING FLUID AGRICULTURAL AGENTS

BACKGROUND OF THE INVENTION

The present invention is directed to a multi-functional tool for applying a fluid treatment agent to plant life, and in particular, is directed to a tool having the capability of selectively applying a liquid agricultural agent both externally and internally depending upon the nature of the plant life being treated.

In applying liquid agents, and in particular liquid herbicides to plant life, it is common to use two separate application tools during two separate application procedures. In order to effectively apply a liquid agent such as a herbicide to thick plant life such as a tree, it is necessary to first cut into the tree and thereafter apply the agent internally in what is commonly referred to as a "hack and squirt" application. This procedure generally requires two tools, a cutting tool such as an ax or hatchet, and a spray applicator to apply the liquid agent once the cut has been made. The spray applicator may also be used to apply the liquid agent externally to other smaller plant life.

The hack and squirt application procedure may be accomplished by the use of a single tool marketed under the name Hypo-Hatchet, which is further described in U.S. Pat. No. 3,286,402 issued Nov. 22, 1966. This tool is similar to a hatchet and includes a handle and a cutting blade mounted to the working end of the tool. A blade nozzle is positioned in close proximity to the leading edge of the cutting blade, and inertia operated switch means are provided which include a member movable by inertial forces resulting from swinging the tool and impact with a tree to both load and discharge a predetermined dosage of fluid into the tree as the tool cuts into the tree. In practice, the Hypo-Hatchet exhibits certain disadvantages. In the first instance, the tool is in the nature of a hatchet in which the cutting blade is not readily replaceable, thereby limiting the useful life of the overall tool. Additionally, the blade spray nozzle is positioned close to the leading edge of the cutting blade and thus is subject to clogging or blockage when the blade is cut into the tree. The Hypo-Hatchet is adapted to apply only predetermined dosages of the liquid chemical agent during each cutting maneuver, thereby precluding the user from controlling the quantity of material applied by applying a quantity of liquid greater or lesser than the predetermined dosage as might be required in certain applications. Finally, because the blade spray nozzle is located close to the cutting blade, the Hypo-Hatchet may only be used effectively for applying a liquid agent in a "hack and squirt" application. It cannot be used to effectively apply the liquid to plant life which is to be sprayed externally because discharge of liquid from the tool is dependent upon the swinging motion and cutting action of the tool and because of the close proximity of the cutting blade to the spray nozzle which necessarily interferes with the aim of the user, adversely affects the user's ability to efficiently maneuver the tool, and adversely affects the range, direction and quantity of liquid material sprayed from the nozzle. Therefore, as a practical matter, even when a Hypo-Hatchet is used in a "hack and squirt" application procedure, a separate application using a different application tool is also required to externally spray plant life which cannot be treated by the "hack and squirt" application method because this tool has no dual spray capability.

It is an object of the present invention to provide a single improved multi-functional application tool in which a fluid agricultural treatment agent, including a liquid herbicide, may be selectively applied using the "hack and squirt" operation to plant life for which this procedure is most effective, while having the capability of independently externally spraying other plant life for which the "hack and squirt" procedure can not be effectively employed. It is a further object of the invention to provide a multi-functional liquid applicator in which the quantity of liquid material applied by the user, either by the "hack and squirt" procedure or by external spraying, is within the control of the user. It is another object of the invention to provide a multi-functional applicator tool having a useful life in excess of that of the known applicator tools. Further objects and advantages of the tool of the present invention will become apparent from the following description.

SUMMARY OF THE INVENTION

The present invention provides a multi-functional tool for applying a fluid chemical agent, and in particular a liquid herbicide, to different types of plant life in the manner most suitable and effective for the plant life being treated. The tool includes a handle and a working head on which a replaceable cutting blade is mounted. A first spray nozzle is mounted to the tool head and positioned proximate to the cutting blade, and first switch means are provided to cause automatic discharge of liquid material from the first nozzle when the blade is cut into a tree. A second spray nozzle is positioned on or proximate to the forward end of the tool head, and second switch means are provided on the tool to manually control the discharge of liquid from the second nozzle. Accordingly, when the "hack and spray" application method is employed, the blade is cut into a tree or other plant life and liquid material is sprayed automatically through the first nozzle and internally applied into the cut area. When external application of the liquid material is desired, the user merely aims the second nozzle on the tool head toward the plant life to be sprayed, and manually actuates the second switch means to discharge liquid from the forwardly oriented second nozzle. The same liquid agent is discharged through both the first and second spray nozzles, and thus may be supplied to the tool from a common source of supply.

The first switch means proximate to the cutting blade may be automatically actuated when the blade cuts into a tree and automatically deactuated when the blade is retracted from the tree. In this manner, the user controls the quantity of material internally applied to the cut area by controlling the time in which the blade remains in the cut area. In the alternative, the first switch means may be manually actuated by the user to permit the user to control the quantity of liquid material internally applied to the tree by controlling the time that the switch is manually depressed. The second switch, which controls the spray through the second nozzle for the external application of liquid material, is manually actuated by the user to control the quantity of liquid material discharged from the second spray nozzle. Preferably, the cutting blade of the tool is replaceable so that the useful life of the overall tool does not depend upon the useful life of the original cutting blade.

BRIEF DESCRIPTION OF THE DRAWINGS

The single drawing figure illustrates a perspective view, partially in section, of the multi-functional fluid applicator tool of the present invention.

DESCRIPTION OF THE BEST MODES FOR CARRYING OUT THE INVENTION

Referring now to the drawing, the multi-functional liquid applicator tool is generally designated by the reference numeral 2. The tool includes a handle 4, a head 6, and a replaceable cutting blade 8 which is removably mounted to the tool head by a set screw 10.

The tool handle 4 is preferably hollow, or at least partially hollow, to receive therein a first fluid conduit or hose 12 which branches into two separate conduits or hoses 14 and 16. The conduits 14 and 16 extend longitudinally through the hollow handle 4. The end of the conduit 12 remote from the tool head 6 is coupled by a quick release connector 18 to an external supply conduit 20 which itself is connected to a source or tank of pressurized fluid (not shown in the drawing). The external conduit 20 is connected by the quick release connector 18 to the internal conduit 12 at the bottom end 22 of the handle 4 which defines a suitable opening.

After the conduit 14 branches off from the main conduit 12 and extends longitudinally through the hollow handle 4, it enters the tool head 6 which is also preferably partially or completely hollow. The forward end of the conduit 14 terminates at a blade nozzle 24 which is mounted to the tool head 6 proximate to the cutting blade 8. As can be seen from the drawing, the blade nozzle 24 is oriented in the same direction as the leading cutting edge 26 of the blade mounted to the tool head, and the nozzle 24 is recessed rearwardly from the blade. A spring loaded switch 28 for the blade nozzle 24 is mounted to the tool head 6 and disposed between the blade nozzle 24 and the tool head 6. A U-shaped switch actuator 30, which is operatively associated with the switch 28 for the blade nozzle 24, is mounted to the switch 28 and disposed between the switch 28 and the blade nozzle 24. The switch actuator 30 is oriented to extend in a direction toward blade 8 and overlaps at least a portion of the blade. The portion of the switch actuator overlapping the blade is adjacent to at least one side of the blade. Preferably, the switch actuator has a mirror image portion (not shown in the drawing) which overlaps and is adjacent to at least a portion of the other side of the blade 8. The switch actuator 30 is resiliently biased by the spring loaded switch 28 in a direction away from the switch 28 and toward the leading edge 26 of the blade 8.

Conduit 16, the second conduit branching out from the main conduit 12 within the hollow handle 4, also extends longitudinally through the handle portion 4 of the tool and into the hollow head 6, terminating at a spray nozzle 32. The spray nozzle 32 is mounted to the forward end of the tool head 6 and oriented in a direction forward of the tool 2. A switch 34, which is mounted toward the bottom of the handle 4, is operatively associated with the conduit 16 supplying liquid to the spray nozzle 32. The switch 34 is manually controlled by the user of the tool to control the fluid flow through the conduit 16 and the fluid discharge from the spray nozzle 32.

In operation of the tool, an external tank containing pressurized fluid to be applied by the tool is strapped to the back of the user. The conduit 20 extending from the tank of pressurized material is connected to the conduit 12 within the hollow tool handle by the quick release connector 18 at the bottom end 22 of the tool. The external tank is conventional and may be of the type employing pressurized carbon dioxide to provide the driving pressure causing the flow of the liquid material from the supply tank through the conduit 20. In the alternative, a hand pump may be employed to provide the driving pressure to the tank to result in the pressurized flow of the fluid material in the tank through the conduit 20.

The tool of the present invention is intended to apply liquid agricultural treatment material such as liquid herbicide sold by the American Cyanamid Company under the trademark CHOPPER, or other liquid herbicide materials, particularly imidozolinone and imazapyr products. However, the tool may also be employed to apply other liquids including other liquid agricultural treatment agents in a similarly efficient manner. Moreover, the tool is capable of applying gases in the same manner that it applies liquids.

Once the pressurized tank of supply fluid is connected to the tool by coupling conduit 20 to conduit 12, the pressurized supply fluid flows through conduit 14 to the blade nozzle 24 positioned at the end of the conduit as a result of the driving pressure of the supply tank. The blade nozzle 24 is normally maintained in a closed position by the spring biased blade nozzle switch 28. The pressurized fluid from the common supply tank simultaneously flows through conduit 16 to the switch 34 as a result of the driving pressure of the supply tank. The switch 34 obstructs further flow of fluid and prevents discharge of fluid through the upstream forward nozzle 32 located at the end of the conduit 16 by constricting the conduit 16 below the nozzle 32.

When spray of the pressurized fluid is to be discharged from the blade nozzle 24, the user cuts into a tree or other large plant with the blade 8. As the blade advances into the cut area, the switch actuator 30, which is oriented adjacent to the blade, is urged rearwardly away from the leading edge of the blade in a direction against the spring bias of the switch 28 acting upon the switch actuator. The relative movement of the switch actuator to the blade 8 occurs since only the blade and not the switch actuator is received within the narrow cut area, thereby resulting in rearward motion of the switch actuator relative to the blade 8 as the leading edge of the blade 8 advances into the cut area. Relative rearward movement of the blade actuator against the spring bias of the switch 28 causes the blade nozzle 24 to open and results in the spray of the pressurized liquid in the conduit 14 from the blade nozzle 24. The blade nozzle 24 is oriented in the same direction as the leading edge of the blade 8, so that the liquid from the blade nozzle 24 is sprayed directly into the region of the cut to internally apply the sprayed fluid into the cut area. As the blade is retracted from the cut area, the force acting upon the switch actuator 30 is relieved and the opposing force of the spring bias acting on the switch actuator again dominates and causes relative movement of the switch actuator in a direction toward the leading edge of the blade. The movement of the switch actuator toward the blade 8 closes the blade nozzle 24, preventing any further spray of fluid through that nozzle.

It is thus apparent that the user of the tool may readily control the quantity of liquid material discharged from the conduit 14 through the blade nozzle 24 and internally applied to a cut area of a tree or other plant life. Since discharge of the pressurized liquid through the blade nozzle 24 only occurs during the time that the blade 8 is received within a cut in a tree, the user merely allows the blade to remain in the area for a sufficient time to enable the desired quantity of treatment material to be applied to this area. When the desired quantity has been applied, the user removes the blade from the cut area and the spray of treatment material through the blade nozzle 24 automatically ceases. The discharge opening on the blade nozzle 24 may be adjustable in a conventional manner so that the rate of discharge of the fluid through the blade nozzle may be controlled, adjusted or pre-set by the user. Accordingly, the user of the tool can readily control the quantity of treatment material applied to a cut area by merely cutting into a tree or other plant life and removing the tool after a predetermined time period. No manual manipulation of switches is required since the blade nozzle is automatically opened and closed by the cutting operation alone.

As illustrated in the drawing, blade nozzle 24 is preferably recessed from the blade 8 to avoid any clogging or obstruction problems to the nozzle during the cutting operation. In the event that the tool becomes stuck in the object being cut, the operator may nonetheless stop the spray from the blade nozzle by merely disconnecting the conduit 20 from the conduit 12 by the quick release connector 18 to interrupt the supply of the pressurized fluid from the source. It is further within the scope of the invention to provide a manually actuated shut-off valve (not shown) on the handle 4 of the tool and operatively associated with the conduit 14 to provide additional means for the user to quickly prevent any further discharge of material through the blade nozzle 24.

When liquid treatment material is to be applied to plant life which can not be cut in the manner described above, the material may be applied externally by spray from forward nozzle 32 mounted to the forward end of the tool head 6. The user manually actuates the switch 34 to open the conduit 16 leading to the nozzle 32. When this occurs, the pressurized fluid flows through the conduit 16 past the switch 34 and is discharged from the forward spray nozzle 32. The spray nozzle 32 is aimed at the plant life to be treated by the user, and the spray discharged from the nozzle 32 is thus directly externally applied thereto. When the desired quantity of material has been discharged, the user merely releases the switch 34 which returns to its to closed position and constricts the conduit 16 to obstruct any further flow of pressurized fluid therethrough. The switch 34 is resiliently biased in a conventional manner to act upon and close the conduit 16 in its normal position, and permit flow through the conduit 16 when the bias is manually overcome by the user. Therefore, when discharge of the treatment material through the forward nozzle is desired, the user merely depresses the switch 34 for a sufficient time to permit the desired quantity of material to be discharged through the nozzle 32. Thereafter, the user removes his finger from the switch 34, allowing it to assume its normally closed position in which further fluid flow through the conduit 16 is obstructed. As discussed with respect to blade nozzle 24, conventional means may be provided by which the user may selectively adjust the size of the discharge opening of nozzle 32 to control, adjust and otherwise regulate the rate of flow of the material discharged through that nozzle.

Likewise, a shut-off valve (not shown) for the conduit 16 may be provided as backup means to quickly stop the discharge of material from the forward nozzle 32 in the event that the switch 34 malfunctions. The flow of fluid through the conduit 16 may also be stopped by disconnecting the supply line 20 from the internal conduit 12 to disconnect the source of pressurized material and the driving pressure from the tool in the same manner as discussed with respect to the blade nozzle 24.

Preferably, the tool itself will be made from conventional materials. Since the handle and head are preferably hollow, these components should be formed from a durable material such as a metal or hard plastic. Also, the tool should be lightweight as a convenience to the user who may be required to hold the tool for long periods of time during a spraying operation. The conduits 12, 14 and 16 may be formed from any suitable resilient or flexible material (as, for example, rubber) to enable the switches, such as the switch 34, to exert a resilient force against the conduit to cause it to readily constrict and obstruct fluid flow therethrough. The conduit should be made from a durable material since it is internally disposed within the handle and head of the tool and may be difficult to repair or replace. Likewise, the conduit should be formed from material which will not react with the fluids intended to be applied by the tool. The spray nozzles 24 and 32 are removably mounted to the tool, as for example by screwing, so that the nozzles may be replaced or exchanged. The blade 8 should be formed from a metal or metal alloy which is durable and can tolerate intended extremes in temperature (particularly cold) in which the tool is likely to be used. Preferably, the blade is replaceable so that the tool is not rendered useless if the blade breaks or is worn beyond a degree where it can no longer be used in an effective manner. Thus, the replaceable blade extends the useful life of the overall tool.

As more fully discussed above, fluid is automatically discharged through the blade nozzle 24 when the blade is cut into an object, and the discharge automatically ceases when the blade is removed from the object. As an alternative embodiment of the invention, this automatic spray feature may be eliminated by removing the switch 28 and the switch actuator 30, and replacing these elements with a manually actuated switch mounted to the handle and adapted to act on the conduit 14 in a manner similar to the operation of switch 34 on conduit 16. This will provide the user with exclusive manual control of the discharge fluid from nozzle 32. Moreover, it is within the scope of the present invention to provide conventional override means by which the user may selectively elect to employ either the automatic spray feature or the manual control of spray through the nozzle 24. This may be accomplished, for example, by providing a clutch by which the user may selectively disengage the resiliently biased switch actuator 30.

It is apparent from the above description that the tool of the present invention is multi-functional and enables the user to apply the same agricultural fluid agents in different manners most suitable for particular applications at the selection of the user. Where appropriate, the tool enables application of treatment fluid by the "hack and squirt" operation. In the alternative, plant-life may be externally sprayed with treatment fluid where the "hack and squirt" procedure is not feasible. Therefore, the user may at his election apply the treatment material either internally or externally (or both) as the circumstances may warrant. In either event, the user is required to carry only a single tool and a single source or supply of the material to be applied. Accordingly, the multi-functional tool of the present invention avoids the necessity of either carrying two separate tools for different treatment applications, or the necessity for the user to apply the treatment fluid in two separate spraying operations using two different application tools.

The tool of the present invention is also versatile in that the user controls which method of application will be employed for any treatment, and exclusively controls the quantity of treatment material discharged from either the blade discharge nozzle or the forward discharge nozzle. Although it is possible to provide the tool with a metering device to discharge only predetermined quantities of material from either or both of the nozzles, the tool is preferably used in the manner described above in which the operator maintains exclusive control over the quantity of material discharged from both discharge nozzles.

The versatility of the tools is further exhibited by the fact that although the tool is to be used preferably for the application of liquid agricultural treatment material, and more particularly liquid herbicides, the tool itself may be used to apply other fluids including other liquids and gases. Accordingly, the single multi-functional tool of the present invention may be employed to selectively apply a wide variety of different fluids in the different manners of application described herein.

Other variations and modifications of the invention will become apparent to those skilled in the art. Accordingly, the description of the invention provided herein is illustrative only and not restrictive of its scope, that scope being defined by the following claims and all equivalents thereto.

I claim:

1. A tool for applying an agricultural treatment fluid, said tool comprising:
   a tool handle and a tool head attached to an end of the handle,
   a cutting blade having a forward cutting edge mounted to said tool head,
   first fluid discharge means including a first fluid discharge outlet mounted to said tool head proximate to said cutting blade,
   first switch means operatively associated with said first fluid discharge means for controlling the discharge of fluid from said first fluid discharge outlet,
   second fluid discharge means including a second fluid discharge outlet mounted to said tool, and
   second switch means operatively associated with said second fluid discharge means for controlling the discharge of fluid from said second fluid discharge outlet.

2. The tool of claim 1 wherein said first fluid discharge outlet includes a first spray nozzle mounted to said tool head and oriented to spray fluid in a direction toward said cutting blade.

3. The tool of claim 2 wherein said first spray nozzle is positioned rearwardly of said forward cutting edge of said cutting blade.

4. The tool of claim 1 wherein said second fluid spray nozzle mounted to the tool head.

5. The tool of claim 4 wherein said second spray nozzle is mounted to the forward end of said tool head and oriented to spray fluid in a direction forwardly of said tool head.

6. The tool of claim 1 further including means for removing said cutting blade mounted to said tool head for replacing said cutting blade.

7. The tool of claim 1 wherein said tool handle and said tool head are at least partially hollow, and said first fluid discharge means includes a first fluid conduit received within said tool handle and said tool head, one end of said first fluid conduit terminating in said first fluid discharge outlet and the other end of said first fluid conduit adapted to be coupled to a source of fluid.

8. The tool of claim 1 wherein said tool handle and said tool head are at least partially hollow, and said second fluid discharge means includes a second fluid conduit received within said tool handle and said tool head, one end of said second fluid conduit terminating in said second fluid discharge outlet and the other end of said second fluid conduit adapted to be coupled to a source of fluid.

9. The tool of claim 1 wherein said tool head and tool handle are at least partially hollow, said tool including a first fluid conduit received within said tool head and said tool handle and having one end terminating at said first fluid discharge outlet, a second fluid conduit received within said tool head and said tool handle and having one end terminating at said second fluid discharge outlet, the other ends of each of said first and second fluid conduits being adapted to be coupled to a common source of fluid.

10. The tool of claim 9 further including first valve means operatively associated with said first fluid conduit and second valve means operatively associated with said second fluid conduit, said first and second valve means being adapted to selectively prevent fluid flow through said first and second fluid conduits respectively.

11. The tool of claim 1 wherein said first switch means includes a switch actuator resiliently biased in a direction toward said cutting edge of said cutting blade, said switch actuator being moveable in a direction against said bias to open said first fluid discharge outlet in response to relative movement between said cutting blade and said switch actuator.

12. The tool of claim 10 wherein said switch actuator is adjacent to and at least partially overlaps said cutting blade.

13. The tool of claim 1 wherein said second switch means includes a manually actuated switch mounted to the handle of said tool for controlling the discharge of fluid from said second fluid discharge outlet.

14. The tool of claim 1 wherein said first switch means includes a manually actuated switch mounted to the handle of said tool for controlling the discharge of fluid from said first fluid discharge outlet.

15. The tool of claim 1 wherein said first and second fluid discharge means are adapted to be coupled to a common source of fluid by a quick release connector.

16. The tool of claim 1 including first means for adjusting the rate of flow of fluid through said first fluid discharge outlet and second means for adjusting the rate of flow of fluid through said second fluid discharge outlet.

17. A tool for applying a fluid, said tool comprising:
   a tool handle and a tool head attached to an end of the handle,
   a cutting blade mounted to said tool head,
   a first discharge nozzle mounted to said tool head behind said cutting blade, a first conduit connecting a source of pressurized fluid with said first discharge nozzle, first switch means for controlling the discharge of fluid from said source through said first discharge nozzle, a second discharge nozzle mounted to the forward end of said tool head, a second conduit connecting said second discharge nozzle to said source of pressurized fluid, second switch means for controlling the discharge of fluid from said source through said second discharge nozzle, said fluid from said source being selectively dischargeable from both said first and second discharge nozzles.

18. The tool of claim 17 wherein said first switch means is automatically actuated to permit flow of said pressurized fluid from said source and through said first spray nozzle in the direction of a cut area in response to cutting action by said cutting blade, and said second switch means is manually actuated at the selection of the user.

19. A tool for applying an agricultural treatment liquid, said tool comprising:

a tool handle and a tool head attached to an end of said handle, said tool handle and said tool head being hollow, a cutting blade removably mounted to said tool head, a first liquid discharge nozzle mounted to said tool head and positioned behind said cutting blade, said first liquid discharge nozzle being oriented to spray liquid in a direction toward said forward cutting blade, a second liquid discharge nozzle mounted to the forward end of said tool head and oriented in a direction to spray liquid forwardly of said tool head, a first conduit received within said hollow tool head and handle and connecting said first liquid discharge nozzle with a common source of pressurized liquid, a second conduit received within said hollow tool head and handle and connecting said second nozzle with said common source of pressurized liquid, first switch means for controlling the discharge of liquid from said common source through said first liquid spray nozzle, said first switch means including a resiliently biased switch actuator for causing discharge of liquid through said first liquid discharge nozzle automatically in response to relative movement between said switch actuator and said cutting blade, second switch means for controlling the discharge of liquid from said common source through said second liquid spray nozzle, said second switch means being manually actuatable at the selection of the user, said tool providing independent discharge of liquid from said common source through said first and second liquid discharge nozzles at the selection of the user.

20. The tool of claim 19 wherein said common source of pressurized liquid is an external container of liquid herbicide removably coupled to said first and second conduits within said tool, the pressure of said pressurized source causing the selective discharge of said liquid herbicide through said first and second spray nozzles.

* * * * *

UNITED STATES PATENT AND TRADEMARK OFFICE
CERTIFICATE OF CORRECTION

PATENT NO. : 4,899,488

DATED : February 13, 1990

INVENTOR(S) : Jeffrey E. Faulkner

It is certified that error appears in the above-identified patent and that said Letters Patent is hereby corrected as shown below:

Claim 12, line 1 (Col. 8, line 44);

Delete "claim 10" and substitute --claim 11--.

Signed and Sealed this

Seventh Day of May, 1991

Attest:

HARRY F. MANBECK, JR.

*Attesting Officer*

Commissioner of Patents and Trademarks